No. 713,241. Patented Nov. 11, 1902.
W. QUALLS.
COTTON STALK CUTTER.
(Application filed July 5, 1902.)

(No Model.) 2 Sheets—Sheet 1.

Witnesses
R. A. Boswell
A. L. Hough

Inventor
Wm. Qualls,
By Franklin H. Hough
Attorney

THE NORRIS PETERS CO., PHOTO-LITHO., WASHINGTON, D. C.

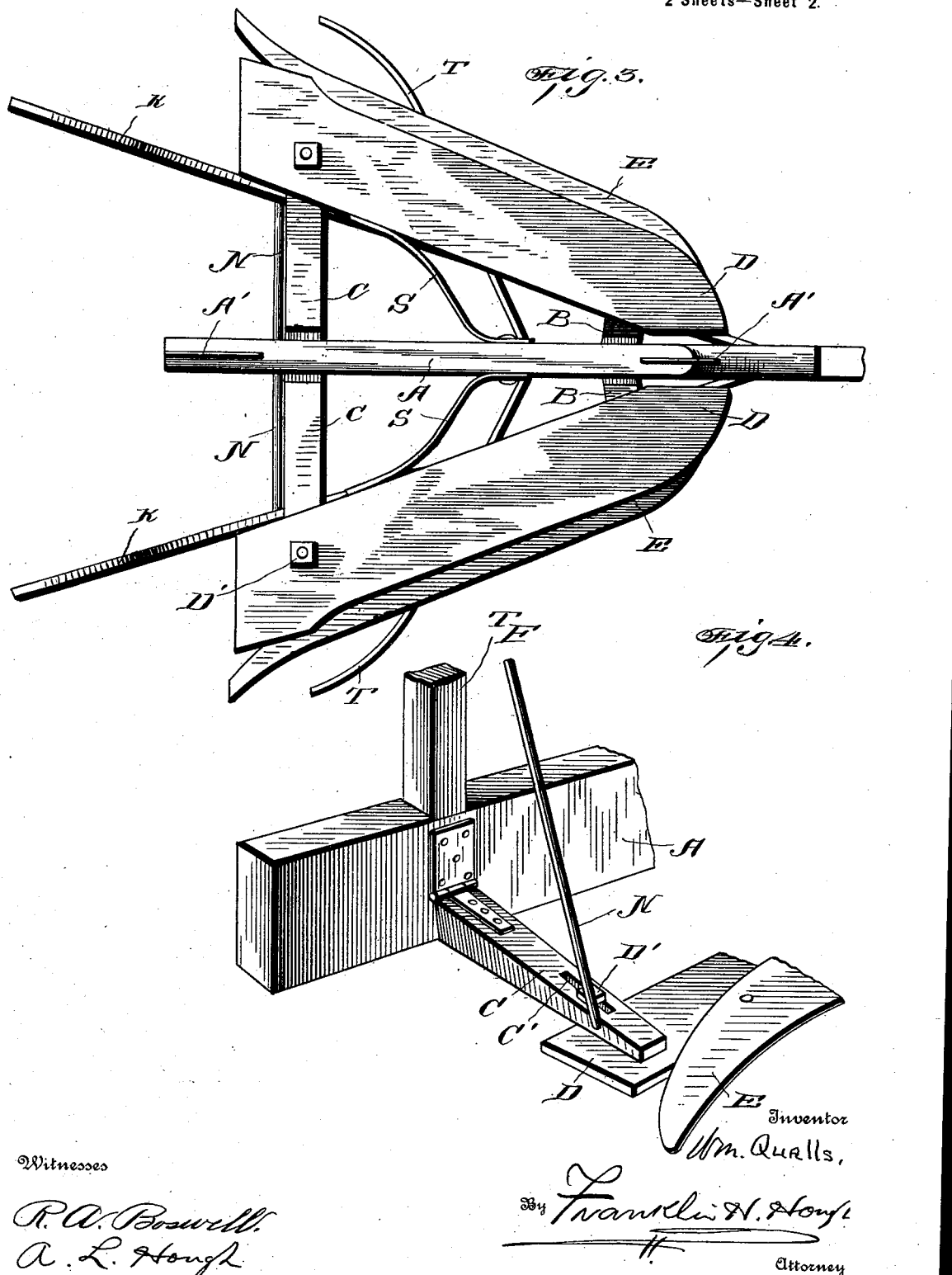

UNITED STATES PATENT OFFICE.

WILLIAM QUALLS, OF LOLLIE, ARKANSAS.

COTTON-STALK CUTTER.

SPECIFICATION forming part of Letters Patent No. 713,241, dated November 11, 1902.

Application filed July 5, 1902. Serial No. 114,443. (No model.)

*To all whom it may concern:*

Be it known that I, WILLIAM QUALLS, a citizen of the United States, residing at Lollie, in the county of Faulkner and State of Arkansas, have invented certain new and useful Improvements in Cotton-Stalk Cutters; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in apparatus for cutting cotton-stalks; and it consists in the provision of a frame having laterally-projecting wings which are adjustably held to the main beam of the frame and provided with knives along their outer longitudinal edges, whereby as the apparatus is drawn over a field two rows of cotton-stalks may be cut simultaneously, means being provided for holding the wings in their extended positions and arms for bending over the stalks as they are being cut.

The invention consists, further, in various details of construction and combinations of parts, as will be hereinafter fully described and then specifically defined in the appended claims.

My invention is clearly illustrated in the accompanying drawings, in which—

Figure 1:
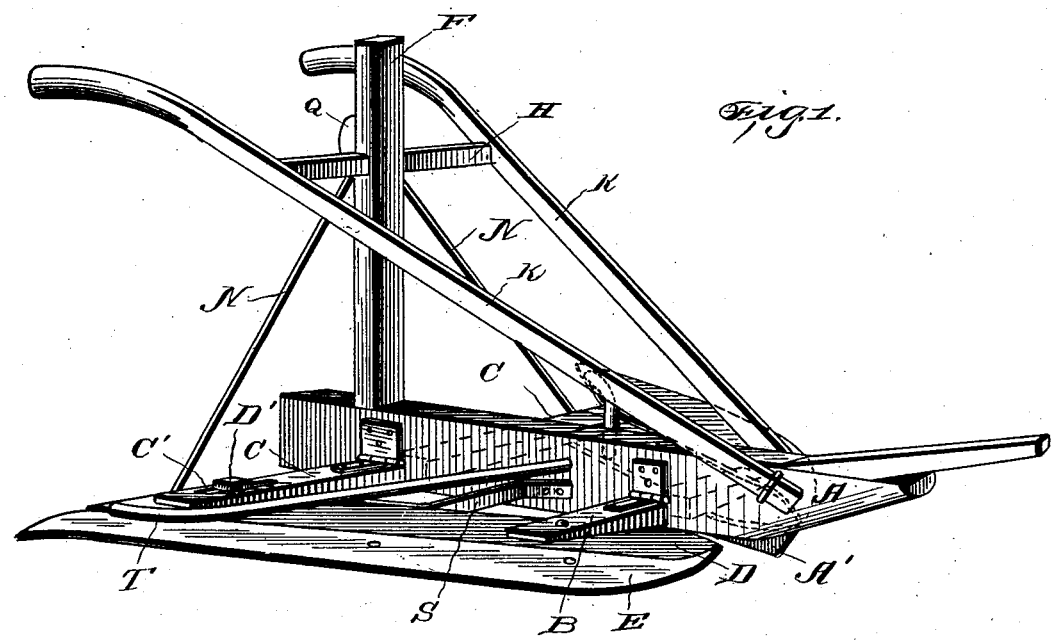
Figure 2:
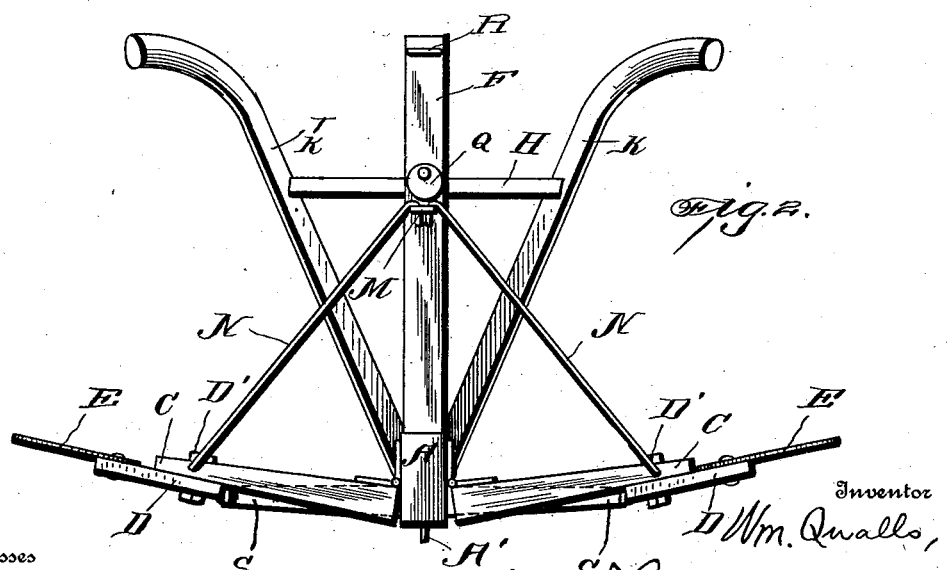

Figure 1 is a perspective view of my improved apparatus for cutting cotton-stalks, &c. Fig. 2 is a rear elevation. Fig. 3 is a bottom plan view. Fig. 4 is a detail view showing the manner in which the rear end of one of the wings has a slight play.

Reference now being had to the details of the drawings by letter, A designates the main beam of the apparatus, which is preferably inclined at its forward end, and projecting downwardly from the under surface of said beam are the metallic guide-strips A', which serve the purpose of guiding the apparatus as it is drawn forward. Hinged to the opposite faces of said beam are the arms B B and C C, the former of which are hinged near the front end of said beam, while the second set of arms C are hinged adjacent to the rear edge thereof. The wings D are rigidly fastened at their forward ends to the under faces of said arms B, and carried on the upper face of each of said wings is a connecting-link D', which passes through the elongated slot C' in one of said arms C and has a limited play therein, thus giving the rear end of each wing a slight lateral play. To the outer longitudinal edge of each wing is fastened a cutting-knife E, which is formed with its outer cutting edge in the shape of a compound curve in order to give a drawing cut as the apparatus is drawn forward. Rising from the upper surface of said beam at a location preferably adjacent to its rear end is a post F, to which is connected a brace H, to the ends of which are connected the handles K, the forward ends of which are fastened to said beam at or adjacent to the forward end of the beam. Rods N are fastened at their lower ends to the hinged arms C, and their upper hooked ends are adapted to engage the eyes M, carried by said post, to hold the cutting-blades in substantially horizontal positions. In order to hold the hooked ends of the rods N in engagement with the eyes M, a cam Q is provided, which is pivotally mounted on the rear face of said post F and when turned in one position is adapted to rest adjacent to the hooked end of the rod and hold the same in the eye which it engages. An eye R is provided at the upper end of said post, in which eye the hooked ends of the rod may be engaged if for any purpose it is desired to hold the knives in slightly-elevated positions.

Fastened to the opposite sides of the beam A are the flexible arms S, the free ends of which are adapted to bear against the inner edges of said wings and normally hold the same at their outer limits, and immediately above the spring-arms are the rods T, the free ends of which are curved slightly rearward and project beyond the cutting-knives carried by the wings and a slight distance above the same, these rods being provided for the purpose of bending the stalks as they are being cut.

The operation of my apparatus will be readily understood, and by the use of the same it will be observed that stalks of cotton or other plants may be readily cut at locations adjacent to the ground, and by means of the adjusting apparatus the wings may be held in raised positions when the apparatus is not in use.

Having thus fully described my invention, what I claim as new, and desire to secure by Letters Patent, is—

1. An apparatus for cutting cotton-stalks, comprising a beam, arms hinged to the opposite faces of said beam, wings fastened to said arms, and cutting-blades on the wings, the rear ends of the wings having a slight lateral play, as set forth.

2. An apparatus for cutting cotton-stalks comprising a beam, arms hinged to the opposite faces of said beam, wings fastened to said arms, cutting-blades on the wings, an upright post mounted on said beam, and rods fastened to the rear set of arms and adjustably held upon said post, as set forth.

3. An apparatus for cutting cotton-stalks comprising a beam, arms hinged to the opposite faces thereof, a post rising from said beam, rods fastened to the rear set of said arms, eyes carried by the post in which the hooked ends of said rods engage, and means for holding said rods to the post, as set forth.

4. An apparatus for cutting cotton-stalks, comprising a beam, arms hinged to the opposite faces thereof, a post rising from the beam, eyes carried thereby, rods fastened at their outer ends to the rear set of arms, said wings having a slight lateral play, the hooked ends of said rods held in said eyes, and a cam carried by the post and adapted to lock one of said hooked ends into the eye which it engages, as set forth.

5. An apparatus for cutting cotton-stalks, comprising a beam, guide-plates mounted in the under face of said beam, arms hinged on opposite faces of the beam, wings secured to said arms, curved cutting-blades fastened to said wings, a post rising from said beam, handles secured thereto and to said beam, rods fastened at their outer ends to the rear set of said arms, and eyes carried by said post which are engaged by the hooked ends of said rods, as set forth.

6. An apparatus for cutting cotton-stalks, comprising a beam, arms hinged on the opposite faces thereof, wings fastened to said arms, cutting-blades fastened to said wings, the rear ends of said wings having a slight play, and flexible arms secured to the opposite faces of said beam and held yieldingly against said wings, as set forth.

7. An apparatus for cutting cotton-stalks, comprising a beam, arms hinged to the opposite faces thereof, wings fastened to said arms, cutting-knives secured to said wings, the rear ends of said wings having a lateral play, flexible arms fastened to the opposite faces of said beam, the free ends of the arms held yieldingly against the inner edges of said wings, a post rising from the beam, rods connecting the rear pair of said arms with said post, connections between the rear pair of arms and said post, and rods projecting from the opposite faces of said beam, and extending over cutting-blades, as set forth.

In testimony whereof I affix my signature in presence of two witnesses.

WILLIAM QUALLS.

Witnesses:
T. S. HIGGS,
HARRY GRAHAM.